United States Patent
Albinsson

(10) Patent No.: US 7,096,757 B2
(45) Date of Patent: Aug. 29, 2006

(54) SETTING DEVICE FOR SAWBLADES

(75) Inventor: Göran Albinsson, Lidköping (SE)

(73) Assignee: Kapman AB, Sandviken (SE)

( * ) Notice: Subject to any disclaimer, the term of this patent is extended or adjusted under 35 U.S.C. 154(b) by 108 days.

(21) Appl. No.: 10/467,869

(22) PCT Filed: Feb. 18, 2002

(86) PCT No.: PCT/SE02/00280

§ 371 (c)(1),
(2), (4) Date: Nov. 24, 2003

(87) PCT Pub. No.: WO02/066192

PCT Pub. Date: Aug. 29, 2002

(65) Prior Publication Data

US 2004/0168551 A1    Sep. 2, 2004

(30) Foreign Application Priority Data

Feb. 19, 2001  (SE)  .................................. 01005461

(51) Int. Cl.
*B23D 63/04* (2006.01)
(52) U.S. Cl. .............................................. 76/58; 76/59
(58) Field of Classification Search .................... 76/58, 76/59, 60–73
See application file for complete search history.

(56) References Cited

U.S. PATENT DOCUMENTS

| | | | | |
|---|---|---|---|---|
| 97,927 A | * | 12/1869 | Jones .............................. | 76/59 |
| 787,519 A | * | 4/1905 | Lindfors .......................... | 76/59 |
| 1,029,991 A | * | 6/1912 | Hampton ......................... | 76/59 |
| 1,078,139 A | * | 11/1913 | Galpin ............................ | 76/59 |
| 1,092,657 A | * | 4/1914 | Lynch ............................. | 76/59 |
| 1,361,927 A | * | 12/1920 | Tiernon et al. ................. | 76/59 |
| 1,456,164 A | * | 5/1923 | Washburn ....................... | 76/59 |
| 1,878,396 A | * | 9/1932 | Hawes ............................ | 76/59 |
| 2,057,439 A | * | 10/1936 | Madsen .......................... | 76/59 |
| 2,081,782 A | * | 5/1937 | Ward .............................. | 76/59 |
| 3,362,263 A | * | 1/1968 | Klein et al. ..................... | 76/59 |
| 4,587,869 A | * | 5/1986 | Hamer ............................ | 76/58 |
| 5,775,179 A | * | 7/1998 | Haas .............................. | 76/58 |
| RE36,409 E | * | 11/1999 | Brown ........................ | 76/25.1 |

FOREIGN PATENT DOCUMENTS

DE    0742067 A1  *  11/1996

* cited by examiner

*Primary Examiner*—Timothy V. Eley
*Assistant Examiner*—Jason Prone
(74) *Attorney, Agent, or Firm*—Dykema Gossett PLLC

(57) ABSTRACT

Setting device for sawblades, where a saw tooth (10) to be set is bent by contact with a ridge (17) on one among two conical detting rollers (14, 15), while the sawable is squeezed between two cydrical pressure rollers (12, 13) with axes which are parallel to the setting rollers but controllably displaceable, and the rotation of the setting rollers is adapted to the velocity of the sawblade by measuring the passage of the saw teeth past a measuring device and comparing with the angular position of the setting rollers.

6 Claims, 3 Drawing Sheets

SETTING DEVICE FOR SAWBLADES

BACKGROUND

Sawblades for wood or metal are commonly made with individually set teeth, where the teeth have been shaped by plunging, grinding or milling, followed by pressing to the right or left by impact devices while the sawblade is stationary. The motion of the impact devices may be rectilinear or arcuate. If each impact device presses a single tooth, the same impact device may be used for sawblades with different pitch distances, but that requires a long time since the sawblade must be moved and stopped for every tooth. It is also possible to make the impact devices such that each impact device will press a group of teeth at each impact, as described in the publication EP 0 742 067. This allows a faster setting operation since the displacement will be as long as the group of teeth, and the setting to the right and to the left may occur simultaneously, but the impact devices must be powerful, and a change of the number of teeth in the group will require a change of impact device, and it may be difficult to control the precision in setting angle within a group. The time will generally be longer for such sawblades for metal that have small and many teeth. Therefore, such sawblades are often made with wave setting as described in the publication GB 1,123,426, where the sawblade is pulled with a constant velocity between two rollers with undulating conical periphery without stopping during the setting operation. Such sawblades have a low production cost and less risk of deformation of the corners of the teeth than if they had been set with impact devices, but they will be less efficient since in general only one corner of each tooth will be able to cut chips.

The present invention concerns a new setting device for a method which combines the short production time of the wave setting with the precision of the individual setting, and which allows a simple adaptation to sawblades with different thicknesses and different spring-back after setting. The method allows different setting patterns, also with a systematic variation of the setting width or with a variable pitch distance.

DESCRIPTION OF THE FIGURES

The invention will be described with reference to the figures, where.

DESCRIPTION OF THE INVENTION

A setting device according to the invention is primarily intended for use on sawblades of constant and restricted width, such as bandsaw blades and hacksaw blades.

Figure 1:
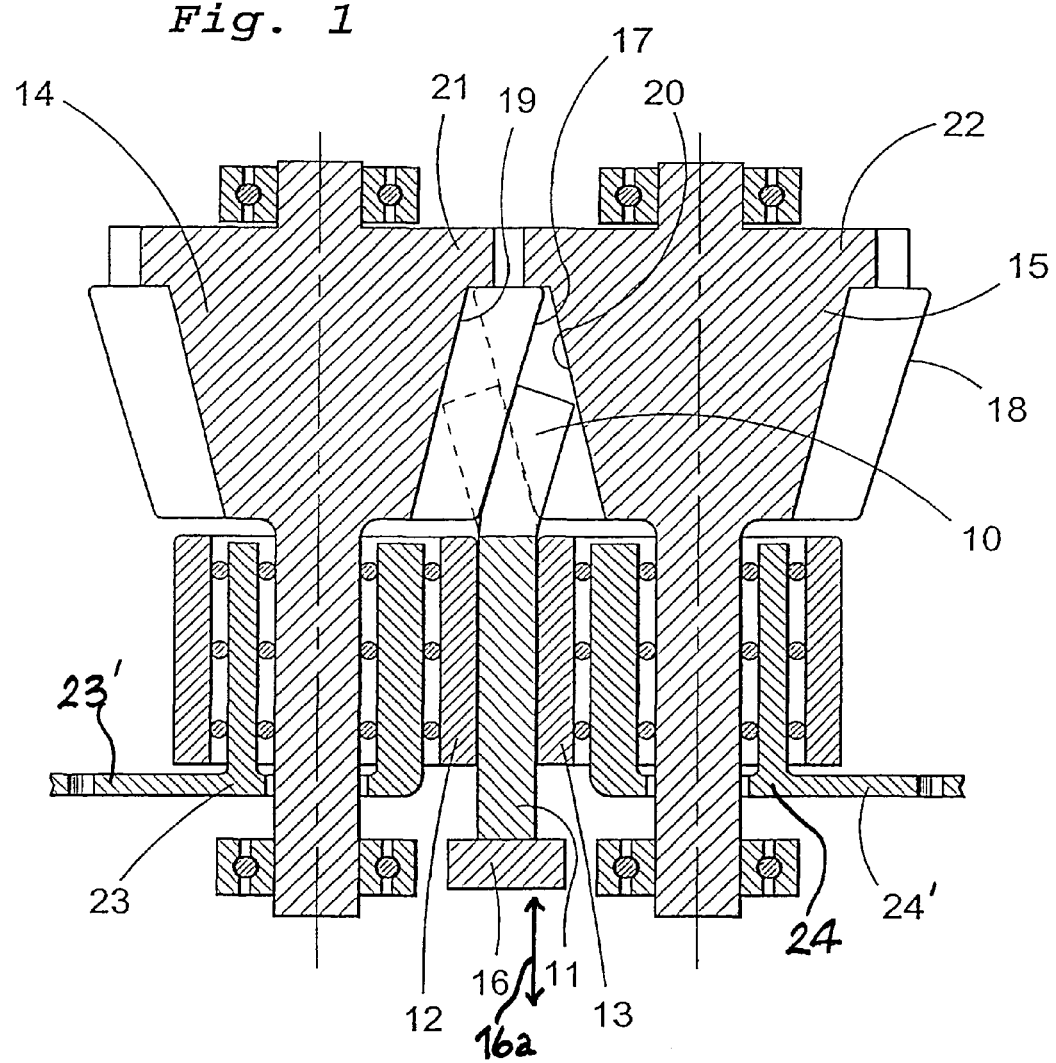
FIG. 1 shows a cross-section through a setting device according to one embodiment of the invention.

FIG. 1 shows a cross-section of the sawblade (11) as it moves while squeezed between two pressure rollers (12, 13) and two setting rollers (14, 15) while the back of the sawblade faces downwards and slides against a supporting rail (16) or a corresponding supporting device. The setting rollers (14, 15) are made with raised ridges (17, 18) and between them grooves (19, 20) which are so deep that where a tooth (10) upon a sawblade is contacted and deformed by a ridge (17) on the one setting roller (14), the corresponding groove (20) on the other setting roller (15) should be so deep that the tooth will not touch the bottom of the groove. The shape of the ridges may be chosen to fit the intended shape of the tooth after setting, and may preferably have a convex or rounded edge to avoid sharp impressions which may disturb the chip flow or be a starting point of cracks. The angular distances between the ridges do not have to be equal, but may be chosen to correspond to the tooth pitch in a group of teeth with variable pitch.

Figure 2:
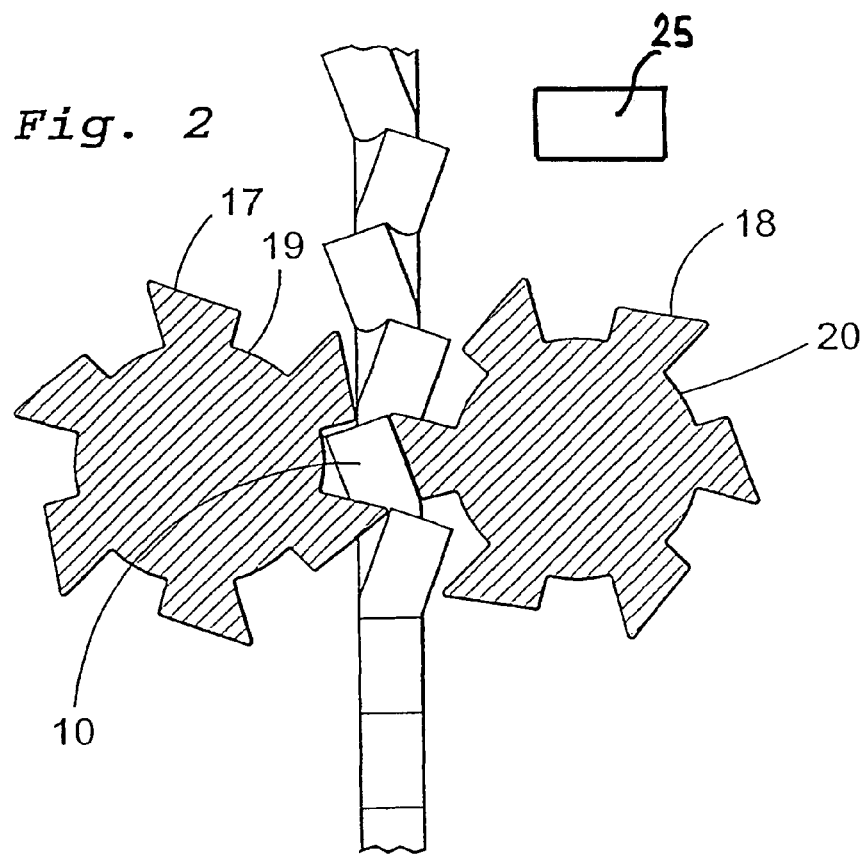
FIGS. 2 and 3 show alternative embodiments of the setting rollers as seen from above, FIG. 2 depicting the situation where all teeth are set alternating right and left, and FIG. 3 depicting the situation where every second tooth remains straight without setting.
Figure 3:
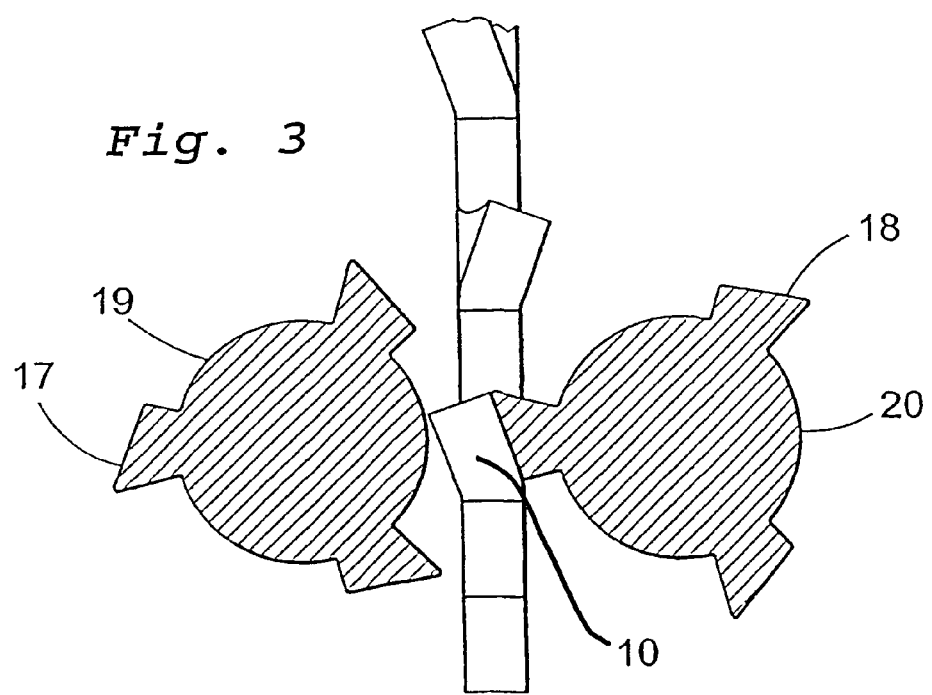

The contact with the setting rollers should not contribute to the forward feeding of the sawblade, which is preferably fed by a separate feed mechanism in front of or behind the setting rollers. This makes it possible to adjust the rotational speed of the setting rollers relative to the feed mechanism in order to ensure that each ridge (17, 18) contacts the corresponding tooth (10) in the correct position. This is possible by measuring the position of the front edge of each approaching tooth optically or mechanically and comparing with the angular position of the setting rollers (see means 25 in FIG. 2). As described in the publication EP 0 742 067 it is known that such measuring of the tooth position may be used to indicate incorrect tooth positions due to damage during shaping of the teeth or errors in welding of bandsaws, and it is then described that such an indication is to be followed by interrupting of the production and readjustment of the machine. According to the present invention, a deviation of the tooth position may instead be compensated for without any stop by a temporary increase or decrease of the velocity of the feed relative to the setting rollers.

The setting rollers (14, 15) are forced to follow the angular position of each other with the same rotational velocity by means of gear as extensions of the ridges (17, 18), or as separate gears fixed to the setting rollers.

Immediately below the setting rollers there are two pressure rollers (12, 13) which are pressed against the sawblade and which are freely rotatable around axes parallel to but slightly displaceable from the axes of rotation of the corresponding setting rollers, such as by use of an intermediate bearing made as eccentric tubular elements (23, 24) which may be rotated by external means, manually or automatically via arms 23' and 24'. It is clear from FIG. 1 that the axes of the pressure rollers will remain parallel to the axes of the setting rollers when displaced by the eccentric tubular elements. Hereby it is possible to compensate for variations of the thickness of the sawblade, and to adjust the position of the sawblade between the setting rollers to get the intended relation between the setting width to the right and the left, in most cases equal, but for sawblades for special use also un symmetric. The pressure rollers (12, 13) are in the simplest case cylindrical (see FIG. 1), but are preferably made with a rounded upper edge to allow the setting to produce a well defined bending zone without stress concentration. The height of the supporting rail (16) is also adjustable as indicated by double arrow 16a, which makes it possible to increase or decrease the setting width if it does not correspond to the specified value by raising or lowering the supporting rail also during ongoing setting. By making the distance between the setting rollers and the pressure rollers small, it is ensured that the ridges (17, 18) will contact a large portion of the height of the tooth (10), thereby avoiding local deformation of the corners of the tooth.

Figure 1B:
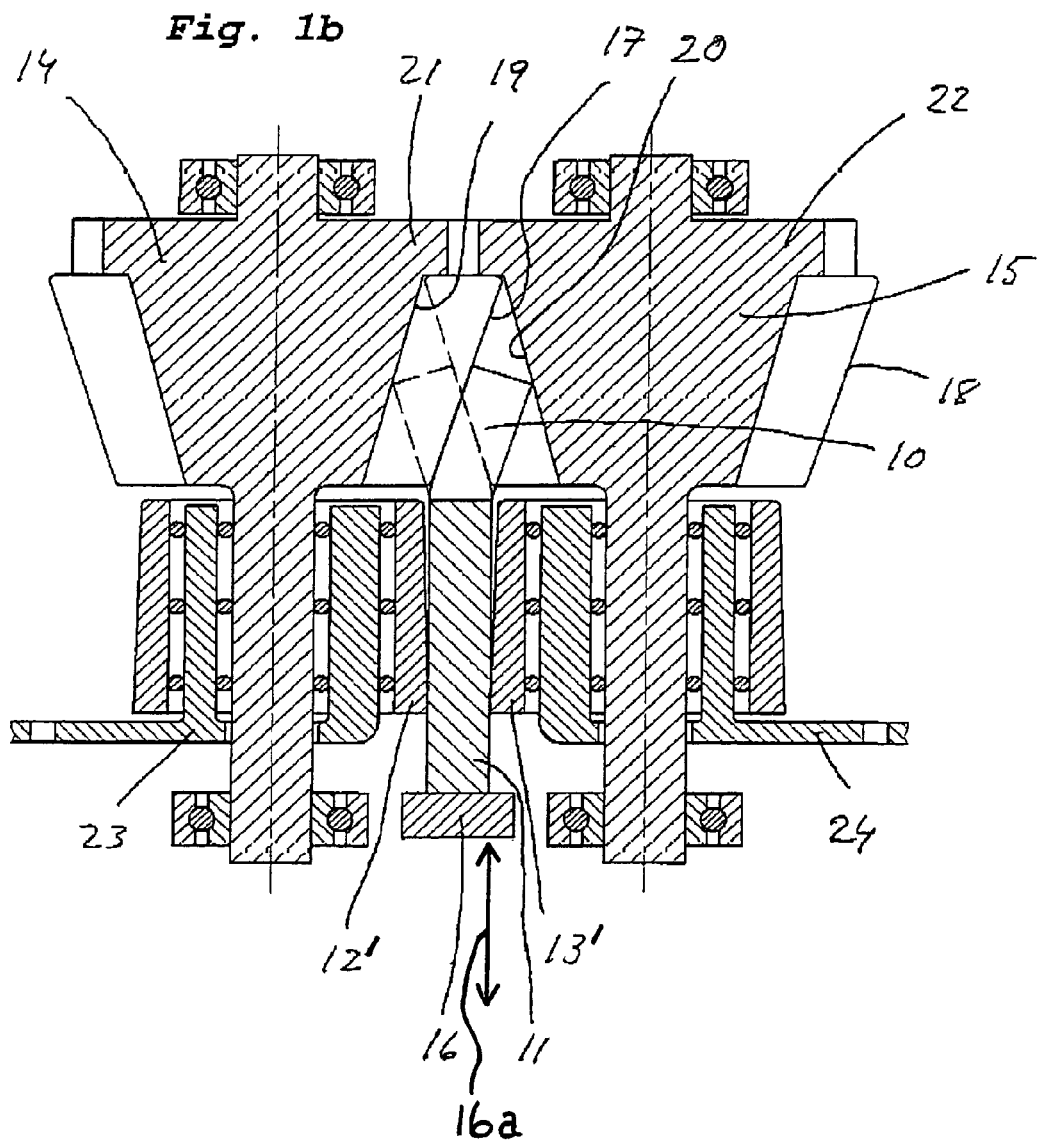
FIG. 1b shows a cross-section through a second embodiment wherein the pressure rollers are slightly conical and have a larger diameter at their lower ends than at their upper ends.

It is already known from bandsaw blades for wood that the blade material adjacent to the toothless edge can be compressed by rollers to create built-in compressive stresses, which makes the sawblade slightly curved, resulting in better stability and better precision in sawing. According to known technology, this is done in a separate machine, but according to the invention the same result is achieved by using pressure rollers which are slightly conical or have a diameter which is slightly increased at the lower edge (see pressure rollers 12' and 13' in FIG. 1*b*).

Since the pressure rollers may be individually offset it is possible to compensate and counteract tendencies of the sawblade to become curved after the setting due to built-in stresses remaining from the manufacture of the raw strip material.

The setting device may also be used for sawblades with variable width but straight tooth-line, either by making them initially with constant width until they are given the final width variation after the setting and by punching, or by having them supported and fed during passing through the setting device by a strip with cutouts of such a shape that the lower edge of the strip running against the supporting rail will be parallel to the tooth line of the sawblade.

Naturally, the setting device may also be used for manufacture of traditionally wave-set sawblades, but offers then only the advantage that the symmetry between right and left-set teeth may be easily adjusted and guided by offsetting the pressure rollers.

Within the frame of the invention are also such simple variations using known technique as offsetting the pressure rollers by other means than eccentric bearings, such as linearly, or providing the supporting rail with one or more rollers, or synchronising the setting rollers by other means than gear segments such as by coupling rods or helical gear, or feeding the sawblade by use of powered pressure rollers. The setting device could also be turned around to have the supporting rail above or at the same level as the sawblade.

The invention claimed is:

1. Setting device for a sawblade where each saw tooth to be set is bent by contact with a ridge on one of two setting rollers rotating with identical rotational velocity, wherein said setting rollers are conical, and by the sawblade below the teeth being squeezed between two generally cylindrical pressure rollers having rotational axes which are parallel to axes of the setting rollers, the axis of a first one of the said setting rollers extending through a first one of the said pressure rollers and the axis of a second one of the said setting rollers extending through a second one of the said pressure rollers the pressure rollers being displaceable relative to the setting rollers by means of adjustable eccentric devices in the form of eccentric tubular elements which may be rotated, the axes of the pressure rollers remaining parallel to the axes of the setting rollers when displaced by the adjustable eccentric devices.

2. Setting device according to claim 1, including a vertically adjustable supporting rail on which the sawblade is mounted while passing between the setting rollers.

3. Setting device according to claim 1, wherein the pressure rollers have a larger diameter adjacent to their lower edges where they contact a toothless edge of the sawblade.

4. Setting device according to claim 1, wherein the pressure rollers are individually displaceable.

5. Setting device according to claim 1, including means for measuring the position of the front edge of each approaching tooth and comparing with the angular position of the setting rollers.

6. Setting device according to claim 5, wherein an angular distance between ridges being varied to let each ridge contact a certain tooth in a group of teeth with variable pitch distance.

* * * * *